US011335016B2

United States Patent
Sato et al.

(10) Patent No.: US 11,335,016 B2
(45) Date of Patent: May 17, 2022

(54) OBJECT CHECKING DEVICE

(71) Applicant: SUBARU CORPORATION, Tokyo (JP)

(72) Inventors: Yoichi Sato, Tokyo (JP); Shoichiro Sako, Tokyo (JP); Marosuke Kikuchi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 16/751,490

(22) Filed: Jan. 24, 2020

(65) Prior Publication Data

US 2020/0242787 A1 Jul. 30, 2020

(30) Foreign Application Priority Data

Jan. 29, 2019 (JP) .............................. JP2019-012788

(51) Int. Cl.
  *G06T 7/33* (2017.01)
  *G06T 7/38* (2017.01)
  *G06T 7/00* (2017.01)
(52) U.S. Cl.
  CPC ................ *G06T 7/337* (2017.01); *G06T 7/38* (2017.01); *G06T 7/97* (2017.01)
(58) Field of Classification Search
  CPC .. G06T 7/337; G06T 7/38; G06T 7/97; G06T 7/75; G06T 7/001; G06K 9/6215; G06K 9/4604
  See application file for complete search history.

(56) References Cited

U.S. PATENT DOCUMENTS

| 7,177,459 | B1 * | 2/2007 | Watanabe | B25J 9/1697 382/151 |
| 7,894,636 | B2 * | 2/2011 | Kozakaya | G06K 9/00208 382/118 |
| 8,903,162 | B2 * | 12/2014 | Cheng | G06T 7/11 382/154 |
| 2017/0236261 | A1 * | 8/2017 | Finch | G06T 7/0006 382/152 |

(Continued)

FOREIGN PATENT DOCUMENTS

JP 2017-172984 A 9/2017
JP 2017172984 A * 9/2017

OTHER PUBLICATIONS

Kahn et al.: "Towards Precise Real-Time 3D Difference Detection Detection for Industrial Application", 2013 Elsevier, Computers in Industry 64, pp. 1115-1128 (Year: 2013).*

(Continued)

*Primary Examiner* — John B Strege
(74) *Attorney, Agent, or Firm* — Troutman Pepper Hamilton Sanders LLP

(57) ABSTRACT

An object checking device includes an area specifying unit, an image generator, and a difference specifying unit. The area specifying unit is configured to, based on a feature part extracted from captured image data obtained by capturing an object, specify an area corresponding to the captured image data in 3D model data of the object. The image generator is configured to generate image data of the specified area from the 3D model data. The difference specifying unit is configured to specify a part in which there is a difference between the captured image data and the image data.

4 Claims, 2 Drawing Sheets

(56) References Cited

U.S. PATENT DOCUMENTS

2018/0211373 A1* 7/2018 Stoppa ................ G06K 9/4628

OTHER PUBLICATIONS

Extended European Search Report issued in corresponding European Patent Application No. 19 21 4463 dated Jun. 2, 2020.
Georgel. P. F., et al. :Navigation Tools for Viewing Augmented CAD Models IEEE Computer Graphics and Applications 65-73 (2009).
Kahn, S., "Reducing the gap between Augmented Reality and 3D modeling with real-time depth imaging" Virtual Reality 17:111-123 (2013).
Communication pursuant to Article 94(3) EPC issued in European Patent Application No. 19 214 463.2 dated Feb. 9, 2022.
Fard, M. G., et al. "Application of Visualization Techniques for Construction Progress Monitoring" Computing in Civil Engineering pp. 1-8, 9 pages submitted (2007).
Bosché, F., "Automated recognition of 3D CAD model objects in laser scans and calculation of as-built dimensions for dimensional compliance control in construction" Advanced Engineering Informatics 24:107-118 (2010).

* cited by examiner

OBJECT CHECKING DEVICE

CROSS-REFERENCE TO RELATED APPLICATIONS

The present application claims priority from Japanese Patent Application No. 2019-012788 filed on Jan. 29, 2019, the entire contents of which are hereby incorporated by reference.

BACKGROUND

The disclosure relates to an object checking device.

In the related art, an object may be inspected based on captured image data from an image capturing device. For example, Japanese Unexamined Patent Application Publication (JP-A) No. 2017-172984 discloses a technique of capturing an aircraft engine with an image capturing device while moving the image capturing device along a frame disposed around the engine. Captured image data is stored together with a position and an orientation of the image capturing device. Before capturing the engine of interest, an engine serving as a reference is captured to generate a master image. The engine of interest is inspected by comparing the master image and the captured image data which are captured at the same position and the same orientation.

SUMMARY

An aspect of the disclosure provides an object checking device. The device includes an area specifying unit, an image generator, and a difference specifying unit. The area specifying unit is configured to, based on a feature part extracted from captured image data obtained by capturing an object, specify an area corresponding to the captured image data in three-dimensional (3D) model data of the object. The image generator is configured to generate image data of the specified area from the 3D model data. The difference specifying unit is configured to specify a part in which there is a difference between the captured image data and the image data.

An aspect of the disclosure provides an object checking device. The device includes circuitry. The circuitry is configured to, based on a feature part extracted from captured image data obtained by capturing an object, specify an area corresponding to the captured image data in three-dimensional (3D) model data of the object. The circuitry is configured to generate image data of the specified area from the 3D model data. The circuitry is configured to specify a part in which there is a difference between the captured image data and the image data.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

DETAILED DESCRIPTION

In the technique described in JP-A No. 2017-172984, the master image is not necessarily identical with design data. When the engine serving as the reference is not identical with the design data, an inspection becomes inaccurate. Development of a technique for accurately performing a process of checking an object, such as a product inspection, has been awaited.

In view of this, it is desirable to provide an object checking device capable of accurately checking an object.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
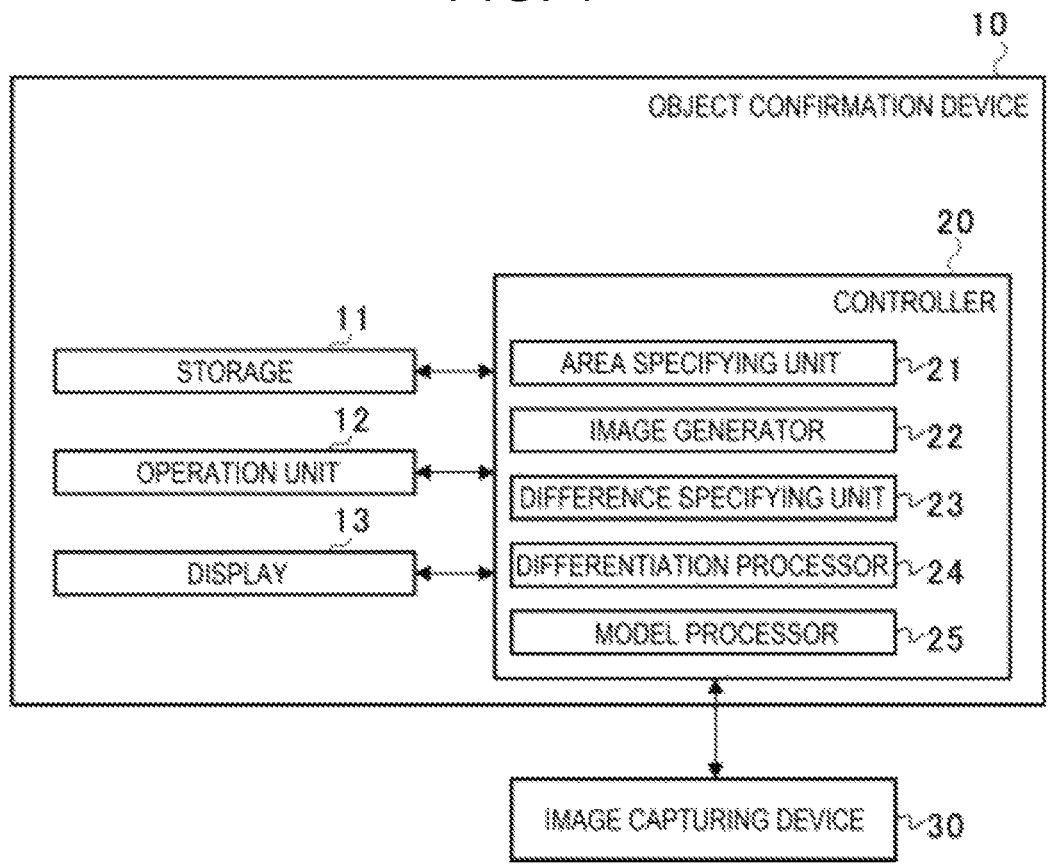
FIG. 1 is a functional block diagram illustrating an outline of an object checking device.

FIG. 1 is a functional block diagram illustrating an outline of an object checking device 10. The object checking device 10 is implemented by a computer such as a personal computer or a workstation. As illustrated in FIG. 1, the object checking device 10 includes a storage 11, an operation unit 12, a display 13, and a controller 20.

The storage 11 includes a RAM, a flash memory, an HDD, and the like. The storage 11 stores three-dimensional (3D) model data that is design data of an object (which will be described later). The operation unit 12 includes, for example, a keyboard or a touch panel superimposed on the display 13. The operation unit 12 receives an input operation by an administrator. The display 13 includes a liquid crystal display, an organic Electro Luminescence (EL) display, or the like.

The controller 20 manages and controls the overall object checking device 10 with a semiconductor integrated circuit including a central processing unit (CPU), a ROM storing a program and the like, a RAM serving as a work area, and the like. The controller 20 also functions as an area specifying unit 21, an image generator 22, a difference specifying unit 23, a differentiation processor 24, and a model processor 25.

The area specifying unit 21 acquires, from an image capturing device 30, captured image data obtained by capturing an object. The image capturing device 30 is implemented by, for example, a digital camera or a smart-phone with a camera function. It is noted that the image capturing device 30 may be implemented by any other device that captures an object to generate captured image data.

Figure 2:
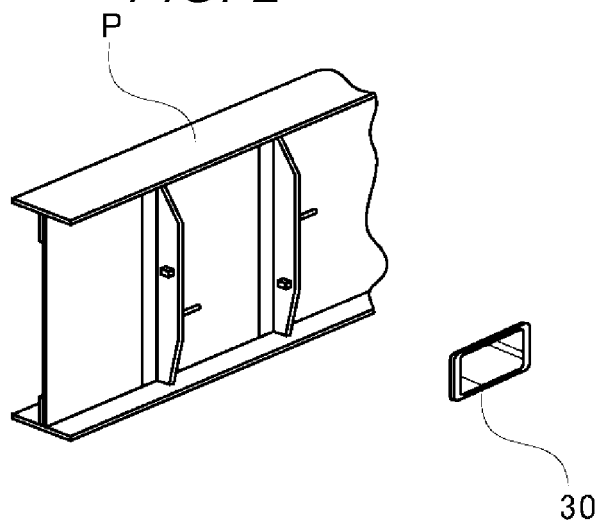
FIG. 2 is a diagram illustrating how to capture an object.

FIG. 2 is a diagram illustrating how to capture an object P. Here, it is assumed that the object P is a component (for example, a combination including a web and a stiffener) for use in an aircraft wing. It is noted that the object P is not limited to this example. The object P may be another component of the aircraft or may be a component of machine other than the aircraft. The object P is simply an article (goods). The object P may be a product (finished product), or may be a part of a product (unfinished product).

An operator carries the image capturing device 30 and captures the object P. The operator captures the object P plural times at various positions, from various angles, and at various angles of view if the image capturing device has an optical zoom function until capturing all parts of the object P. It is noted that the image capturing device 30 may be installed in an imaging place, rather than being carried by the operator. The image capturing device 30 outputs the captured image data to the object checking device 10 via communication.

The area specifying unit 21 extracts feature parts (that is, feature points) from the captured image data. The feature parts are extracted by an edge extraction technique, blob analysis, or the like. Each feature part includes, for example, a characteristic contour (that is, an edge) such as an acute angle part. Further, the area specifying unit 21 performs pattern matching between the plural extracted feature parts and the 3D model data stored in the storage 11. For example, the area specifying unit 21 extracts any of areas in the 3D model data, and derives similarities in a color, a shape, a positional relationship, or the like between the extracted area and the feature parts. The area specifying unit 21 specifies an area in the 3D model data having the highest similarity as an area (angle of view) corresponding to the captured image data in the 3D model data of the object P.

The extraction of the feature parts by the area specifying unit 21 and the area specifying process by the pattern matching are not limited to the above-described process. Any process for use in an augmented reality (AR) technique may be used.

The image generator 22 generates image data (two-dimensional data) of the specified area from the 3D model data. The generated image data has approximately the same angle of view as that of the captured image data.

Figure 3A:
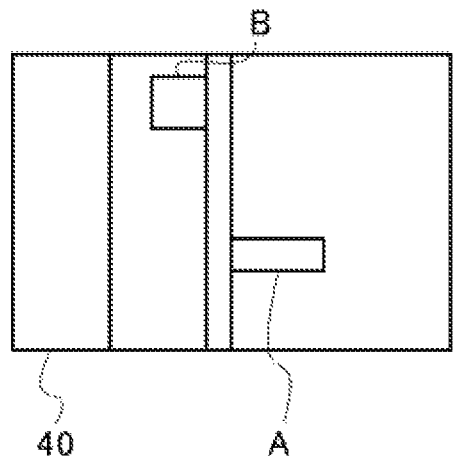
FIG. 3A illustrates an example of image data generated by an image generator.
Figure 3B:
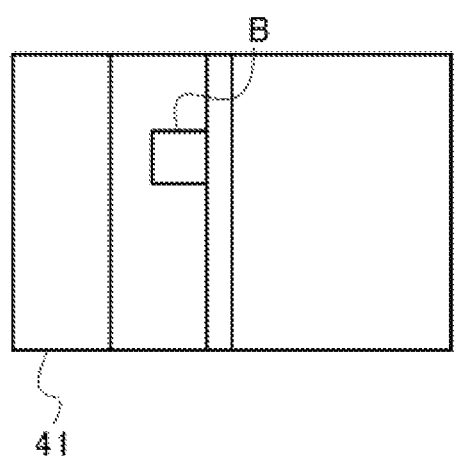
FIG. 3B illustrates an example of captured image data generated by an image capturing device.

FIG. 3A illustrates an example of image data 40 generated by the image generator 22. FIG. 3B illustrates an example of captured image data 41 generated by the image capturing device 30. The image data 40 shows an area corresponding to the captured image data 41.

The difference specifying unit 23 specifies a part in which there is a difference between the captured image data 41 and the image data 40. In the example illustrated in FIG. 3A and FIG. 3B, while the image data 40 includes a component A, the captured image data 41 does not include the component A. A component B in the image data 40 is different in position from a component B in the captured image data 41.

The difference specifying unit 23 extracts the part in which the difference exists between the captured image data 41 and the image data 40 based on, for example, a low similarity provided by the pattern matching or a difference value between binarized images and provisionally determines that the difference exists in the part.

Further, the difference specifying unit 23 specifies a component (hereinafter, referred to as a "component of interest") corresponding to the extracted part based on the 3D model data. When specifying the component of interest, the difference specifying unit 23 acquires tolerance data of the component of interest set in the 3D model data. Further, the difference specifying unit 23 determines whether a position of the component of interest in the captured image data 41 is within a tolerance range indicated by the tolerance data.

The difference specifying unit 23 specifies the component of interest that is not within the tolerance range as a part in which there is a difference, that is, finally determines that the different exists in the part. For example, since the component A does not exist in the captured image data 41 in the first place, the component A is surely out of the tolerance range. Whether the component B is within the tolerance range is determined depending on the position of the component B. For example, it is assumed that the component B is also out of the tolerance range.

Here, the components A and B have been described as examples. The difference specifying unit 23 may determine, for example, whether apart of a certain component is processed and whether the size and the shape of a part of a certain component are correct. In this case, the difference specifying unit 23 acquires the tolerance data of a site (hereinafter, referred to as a "site of interest") corresponding to the part extracted as having a difference, and determines whether the shape of the site of interest in the captured image data 41 is within the tolerance range indicated by the tolerance data.

The differentiation processor 24 processes either one of the captured image data 41 and the image data 40 such that a part in which there is a difference can be specified. Here, an example in which the differentiation processor 24 processes the captured image data 41 will be described below.

Figure 4:
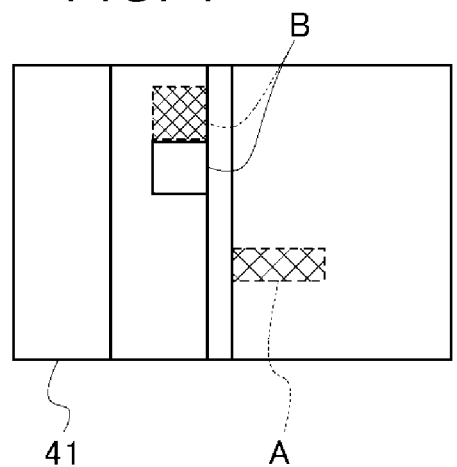
FIG. 4 is a diagram illustrating an example of processed captured image data.

FIG. 4 is a diagram illustrating an example of the processed captured image data 41. As illustrated in FIG. 4, the differentiation processor 24 superimposes images of the components A and B on the captured image data 41 in positions where the components A and B are to be disposed, in such a form that the components A and B can be distinguished from surroundings, for example, the components A and B are colored in a primary color. In addition, the captured image data 41 may be processed such that the component B that is originally shown (but whose position is shifted) in the captured image data 41 can be distinguished from the surroundings.

In addition, the differentiation processor 24 may process a part whose deviation is larger than a threshold value into yellow among parts in which differences exist, even if the deviation of the part is within the tolerance range. In this case, the differentiation processor 24 processes a part that is out of the tolerance range so that the part is colored in a more prominent color (for example, red) among the parts in which the differences exist.

The differentiation processor 24 displays the processed captured image data 41 on the display 13. The operator can recognize a part of the object P that is not disposed as designed by the captured image data 41. The operator performs an operation on the object P such that, for example, the components A and B are disposed as designed.

In this way, when the operator captures the object P with the image capturing device 30 that he/she carries, the object checking device 10 can inspect the object P. Therefore, operation load of the inspection can be reduced. In addition, since the 3D model data is used, the inspection can be performed more accurately than in a case where the actual object P is captured and used as master data.

In addition, the tolerance data provided in the 3D model data is used. Therefore, the following phenomenon can be avoided, that is, a part is displayed as an error even though the part is disposed within the tolerance range. As a result, a useless operation to check whether a part is disposed within the tolerance range can be avoided.

The model processor 25 processes the 3D model data such that a first area to which the captured image data 41 corresponds and a second area to which no captured image data 41 corresponds can be specified in the 3D model data. That is, the model processor 25 processes the 3D model data such that a first area for which the captured image data 41 is generated by the image capturing device 30 and a second area for which no captured image data 41 is generated can be specified in the 3D model data.

Figure 5:
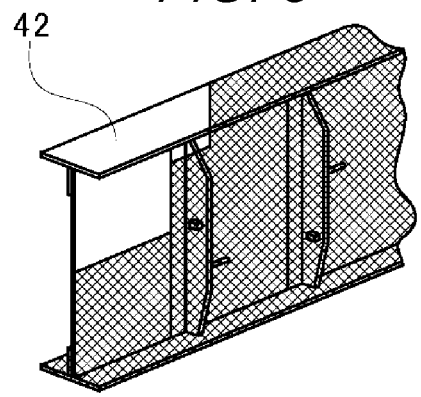
FIG. 5 is a diagram illustrating an example of processed 3D model data.

FIG. 5 is a diagram illustrating an example of processed 3D model data 42. As illustrated by cross-hatching in FIG. 5, the model processor 25 adds a color such as a primary color to an area to which the captured image data 41 already corresponds in the 3D model data 42 such that the area can be distinguished from the surroundings. The model processor 25 displays the processed 3D model data 42 on the display 13.

Here, the description has been given on the example in which the model processor 25 adds the color to the area to which the imaging data 41 already corresponds in the 3D model data 42. However, the model processor 25 may add a color such as a primary color to an area to which no captured image data 41 yet corresponds in the 3D model data 42 such that the area can be distinguished from the surroundings.

By processing the 3D model data 42, the operator can easily understand an area of the object P which is to be captured. In addition, processing the 3D model data 42 reduces the possibility that the operator forgets to capture a part of the object P.

The embodiment of the disclosure has been described above with reference to the accompanying drawings. It is needless to say that the disclosure is not limited to the above embodiment. It is obvious to those skilled in the art that he/she can make various changes and modifications to the embodiment within the scope of claims and it would be appreciated that such changes and modifications belong to the technical scope of the disclosure.

In the embodiment of the disclosure, the description has been given on the example in which the differentiation processor 24 is provided. In this example, the operator can easily understand a part in which there is a difference between the captured image data 41 and the image data 40. It is noted that the differentiation processor 24 may not be provided. The object checking device 10 may include, for example, a speaker, and output (notify) names of the components A and B from the speaker, and inform the operator that there is a difference.

In the embodiment of the disclosure, the description has been given on the example in which the model processor 25 is provided. It is noted that the model processor 25 may not be provided.

Further, in the embodiment of the disclosure, the description has been given on the example in which the object checking device 10 is used to inspect the object P. It is noted that the object checking device 10 is not limited to, for example, inspection use (inspection process). The object checking device 10 may be used in a voluntary checking work (for example, a work for checking whether a component is mounted, a position of a component, or the like) during a manufacturing process of the object P.

In addition, a program that causes a computer to function as the object checking device 10, and a storage medium such as a computer readable flexible disk, a magneto-optical disk, a ROM, a CD, a DVD, or a BD that stores the program may be provided. Here, the term "program" refers to a data processor described in any language or with any description method.

According to the disclosure, it is possible to accurately check an object.

The invention claimed is:

1. An object checking device comprising:
a non-transitory storage medium configured to store three-dimensional model data of an object, the object is made up of a plurality of components that are assembled together in the three-dimensional model data; and
a processor configured to:
receive a captured two-dimensional (2D) image of the object from an image capturing device, the captured 2D image comprising captured image data;
extract at least one feature part from the captured 2D image, the extracted at least one feature part including a characteristic contour;
perform pattern matching between the extracted at least one feature part and a plurality of areas in the stored three-dimensional (3D) model data to derive similarities;
identify an area in the 3D model data that has a highest similarity to the captured 2D image data;
generate 2D image data of the identified area from the 3D model data;
specify a part in which there is a difference between the captured 2D image data and the generated 2D image data;
extract a component corresponding to the part from the plurality of components based on the 3D model data; and
determine whether a position of the extracted component in the captured 2D image data is within a predetermined tolerance range of the extracted component set in the 3D model data, and
a differentiation processor configured to, when the position of the extracted component is not within the predetermined tolerance range, process the captured 2D image data such that an image of a shape of the extracted component is superimposed on the captured 2D image data in a position where the extracted component is to be disposed.

2. The object checking device according to claim 1, further comprising:
a model processor configured to process the 3D model data such that a first area to which the captured 2D image data corresponds and a second area to which no captured 2D image data corresponds can be specified in the 3D model data.

3. An object checking device comprising circuitry configured to:
receive a captured image of an object from an image capturing device, the captured image comprising captured image data;
extract at least one feature part from the captured image, the extracted at least one feature part including a characteristic contour;
perform pattern matching between the extracted at least one feature part and a plurality of areas in stored three-dimensional (3D) model data to derive similarities;
identify an area in the 3D model data that has a highest similarity to the captured image data;
generate image data of the identified area from the 3D model data;
specify a part in which there is a difference between the captured image data and the generated image data;

extract a component corresponding to the part from a plurality of components that make up the object based on the 3D model data;

determine whether a position of the extracted component in the captured 2D image data is within a predetermined tolerance range of the extracted component set in the 3D model data; and process, when the position of the extracted component is not within the predetermined tolerance range, the captured 2D image data such that an image of a shape of the extracted component is superimposed on the captured 2D image data in a position where the extracted component is to be disposed.

4. The object checking device according to claim 1, wherein the generated 2D image data has the same angle of view as the captured 2D image data.

* * * * *